UNITED STATES PATENT OFFICE

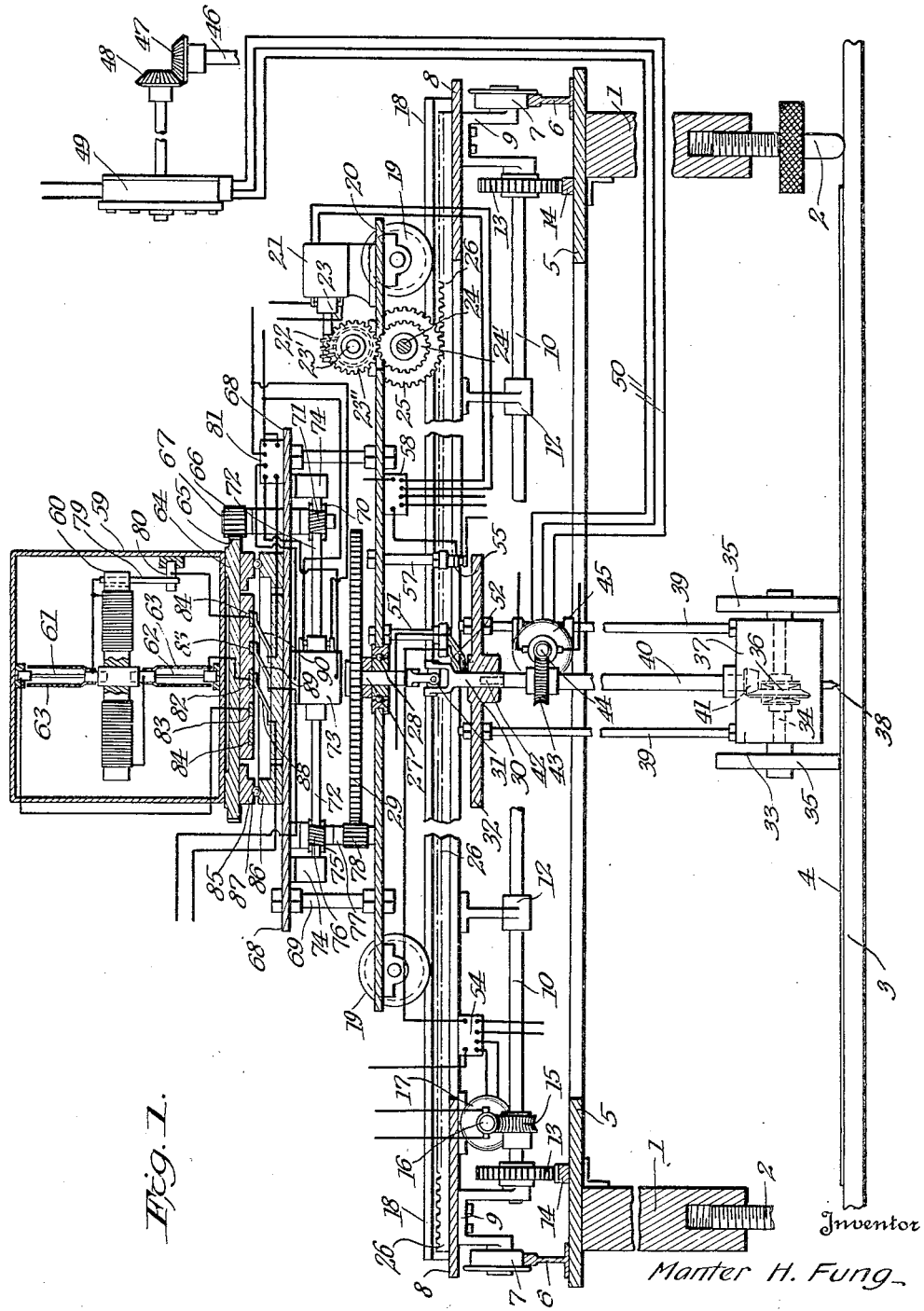

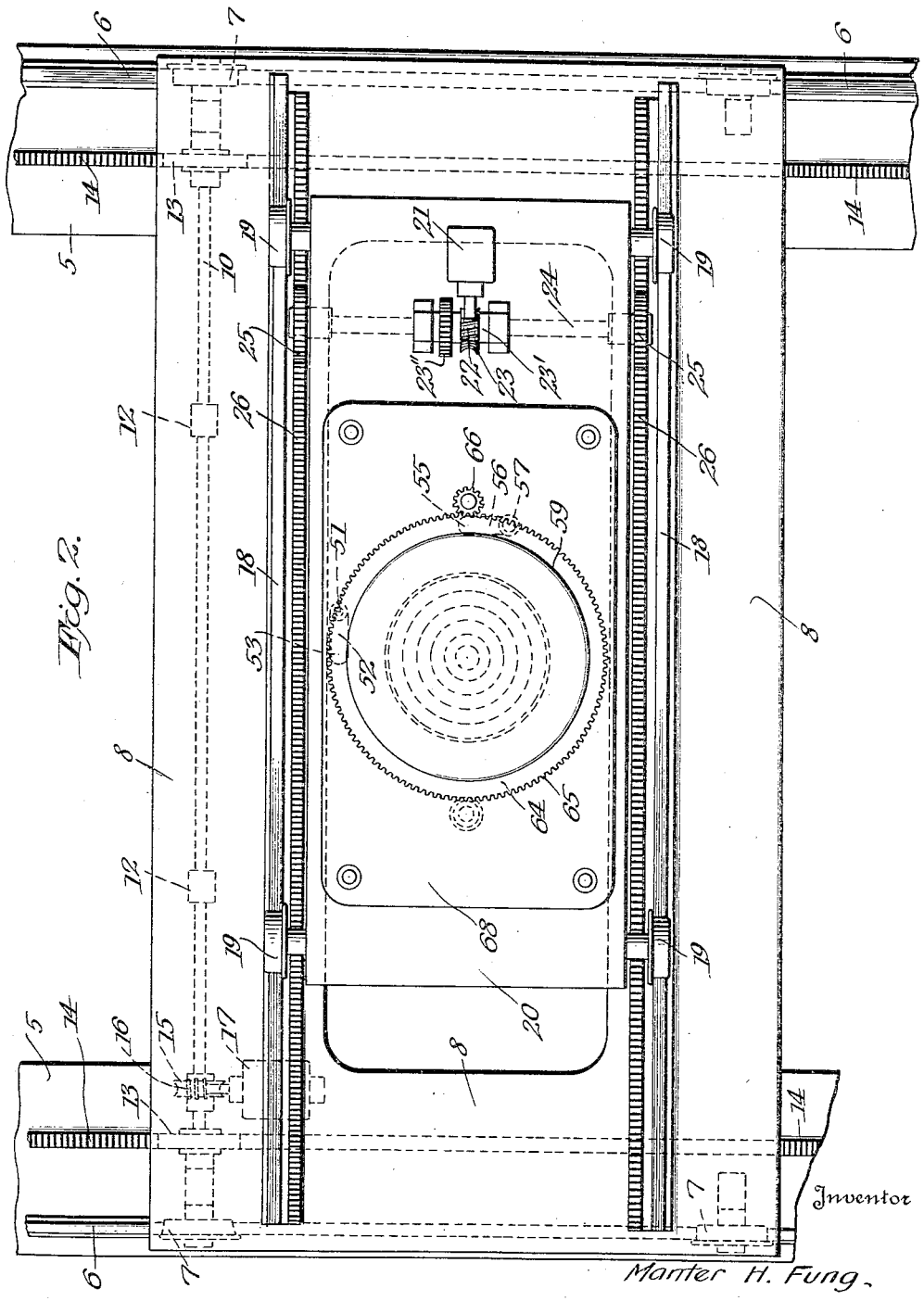

MANTER H. FUNG, OF HONG KONG, CHINA

SURVEYING AND ROUTE-RECORDING MECHANISM

Application filed January 29, 1929. Serial No. 335,773.

A number of devices have been conceived for automatically recording, in map form, the course and distance traveled by carriers, particularly vessels; but nearly all of such devices are impractical. Many of them are not sensitive enough to give results sufficiently accurate to meet requirements; and many others are entirely too complex to be suitable for practical use.

Only in fairly recent years have course and distance plotting devices gone into practical use on vessels; and such devices are used in connection with gyroscope compasses. The results produced by these devices, while satisfactory in some respects yet in other respects fall far short of recording the data in the best possible form. Further, these recording devices in practical use, are designed for and are operative only with gyroscope compasses. Consequently the initial cost of the complete mechanism is very high; the mechanism being very intricate and delicate, usually requires the attention of an expert electrician; and the mechanism including the gyroscope being very heavy is thereby rendered impractical or undesirable for light vessels, automobiles, aeroplanes, etc.

One of the objects of the present invention is to provide a practical and accurate course and distance recording mechanism, which is relatively inexpensive as to both initial cost and upkeep, and which is particularly designed for use with magnetic compasses; the complete mechanism being sufficiently light to adapt it to small vessels, automobiles, aeroplanes, etc. But while it is particularly adapted for use with magnetic compasses, and is so illustrated, yet it is also adapted to use in combination with gyroscope compasses, and it is to be understood that the present invention contemplates such use. Also, instead of using a magnetic compass or a gyroscope compass, the invention contemplates the use of a secondary compass, commonly known as a repeater, which may be controlled by a gyroscope compass or by a magnetic compass.

Another object of the invention is to provide a simple mechanism which will record an exact reproduction of the route traversed, and which is sufficiently light in weight to be installed in automobiles or tractors, and thus permit the rapid yet accurate surveying of roads, or to determine the best course of proposed roads, to survey coast lines, etc. In short, one of the objects of the present invention is to provide means for greatly expediting surveying work of many characters.

A further object of the invention is to provide a device of this character which will accurately record the route traversed, in the same manner as the road lines on a map, and without any movement of the sheet on which the route is recorded.

It is neither necessary nor desirable to attempt to list here the numerous uses to which this invention is particularly adapted. However, by reason of the fact that this device is so simple in construction and operation, so light in weight, and so inexpensive in manufacture as compared with the prior commercial course recording devices, that its field of usefulness is greatly widened; it may not be amiss to mention just a few uses to which the invention is adapted.

The invention is particularly adapted for the smaller ocean going vessels, which for various reasons, such as expense, weight, etc., are not equipped with the prior commercial course recording devices. The invention is also particularly adapted to use with small river and harbor boats, and pleasure boats of various types. When appropriate boats are equipped with the recording device disclosed herein, the surveying of coast lines, rivers, harbors, etc., may be performed with great ease and rapidity. It is needless to mention that the device is also adapted to use in submarines, aeroplanes, and other flying craft. Another extremely important use, is in connection with automobiles, trucks, busses, or tractors. The device being small and light in weight is readily mounted on such vehicles; and when so mounted it provides a quick, inexpensive, and accurate method of general surveying. Also, by such use owners of cars can determine just where the cars have been, and whether or not they have followed the most economical routes. The many uses to which the device may be put in connection with land vehicles, and the many advantages resulting from such uses, will be apparent and therefore need not be described.

The invention will be clearly understood from the following detailed description, when taken in connection with the accompanying drawings; in which Figure 1 is a vertical transverse sectional view of the complete mechanism; parts thereof being shown in elevation; and Figure 2 is a plan view of the mechanism; parts being broken away.

Referring to the drawings more in detail, the legs are extensible, and are therefore formed of two parts, indicated by numerals 1 and 2, which are relatively adjustable, for the purpose of leveling the mechanism. These legs are supported on the table or other device 3 which receives the sheet 4 on which the courses are to be recorded.

The legs 1, 2, are attached to and support a square or rectangular plate 5, the central portion of which is open. This plate carries rails 6 on which travel the wheels 7 of a carriage 8. These wheels are journaled on one arm of brackets 9 fixed to the underside of carriage 8; and the other arm of these brackets journal a shaft 10 which extends beneath the car 8 and for substantially the full length thereof; the shaft being preferably supported intermediate its ends by brackets 12. Keyed or otherwise fixed to this shaft, adjacent its ends, are two gears 13 which are constantly in mesh with racks 14 fixed to the plate 5 and paralleling the rails 6.

Also fixed to the shaft 10 is a worm wheel 15 meshing with a worm 16 driven by a motor 17 which is carried by the carriage 8. It is thus apparent that the rotation of worm 16 will cause the carriage 8 to travel back or forth on the rails 6; the direction of travel depending on the direction of rotation of worm 16. The manner in which the motor is controlled to cause the worm to rotate in either direction will be described hereinafter, but it may be mentioned here that it is constantly rotating one way or the other, even though it may amount to nothing more than a vibratory or oscillatory movement, so that the carriage 8 never comes to complete rest, while the mechanism is in operation.

The carriage 8 consists of a square or rectangular open plate on which are mounted rails 18 extending at right angles to the previously mentioned rails 6. Traveling on the rails 18 are wheels 19 which support a carriage 20. The direction of travel of carriage 20 is always at right angles to the direction of travel of carriage 8. The carriage is driven by a motor 21 which is supported on the carriage and operates a worm 22 meshing with a worm wheel 23 keyed or otherwise fixed to a shaft 23'. Also keyed to the shaft 23' is a gear 23'' meshing with a gear 24' on a transversely extending shaft 24. Also keyed to this shaft are two gears 25 meshing with racks 26 mounted on the carriage 8 and paralleling the rails 18. The manner in which the motor 21 is controlled to drive the carriage 20 back and forth, will be described hereinafter; but it may be mentioned here that the motor shaft is constantly rotating one way or the other, even though it may amount to nothing more than a vibratory or oscillatory movement, so that the carriage 20 never comes to a complete rest, while the mechanism is in operation.

Mounted centrally of the carriage 20, and extending vertically therethrough, is a shaft 27, which is preferably supported by a ball-bearing race 28. Fixed to the upper end of this shaft, just above the carriage, is a large gear wheel 29, and the lower end of the shaft, just below the carriage 20, is operatively connected with a second vertically extending shaft 30; the connection between the two shafts being preferably effected by a universal joint, as indicated by numeral 31. Keyed to this second shaft, to rotate therewith, is a plate or disc 32. This plate or disc is connected with, and rotates the map-car, but before describing the mechanism for rotating the disc, and hence the map-car, in the desired direction and to the desired extent, I shall first briefly describe the map-car.

The map-car is indicated generally by the numeral 33. In the specific form illustrated herein, it comprises an axle 34 carried by wheels 35, which ride on the recording sheet 4. It will be understood that the map-car might be so constructed as to require only one wheel, or it may have three or four wheels; but I preferably employ a two-wheel car. The axle 34 is provided with a differential 36, within a housing 37. This housing also carries a pen or other recording implement 38, which is always in contact with the recording sheet. The recording implement 38 need not be illustrated or described in any detail, as it may be any desired construction, and per se forms no part of the invention. The map-car is rigidly attached to the plate or disc 32, so that the car will follow the rotary movements of said disc, by means of a plurality of rods 39.

In the operation of this device the wheels of the map-car rotate in proportion to the distance traveled by the vessel, automobile, or other vehicle. That is, if the scale is to be one mile to one inch, and the circumference of the wheels is one inch, then the wheels will make one complete revolution for each mile the vehicle travels. For the purpose of thus driving the map-car wheels, I provide a shaft 40, the lower end of which passes through a suitable bearing on the map-car and carries a bevel gear 41 forming part of the differential 36. The upper end of the shaft has a reduced portion 42 which is received within the lower portion of the shaft 30; so that the shaft 30 in addition to functioning to rotate the plate 32, also acts as a bearing for the shaft 40. Of course, these two shafts are free to rotate independently of each other.

Fixed to the shaft 40 is a worm wheel 43, meshing with a worm 44 driven by a motor 45. This is preferably a three phase motor, operable either forward or backward, depending upon whether the vehicle is traveling forward or backward, and, of course, the motor is operated at a speed proportionate to the speed of the vehicle. It will be understood, of course, that the invention is in no way limited to any particular means for controlling or operating the motor 45, and such means therefore have been illustrated only very generally, and a brief description thereof will be sufficient. Numeral 46 refers to a shaft which is connected, through an appropriate reducing mechanism, with any distance measuring mechanism carried by the vessel, automobile, or other vehicle on which the recording device may be mounted. Of course, a clock mechanism may be associated with the shaft 46 when preferred, or in the event that it is impossible to connect it with a distance measuring mechanism. The shaft 46 carries a mitre gear 47 meshing with a mitre gear 48 fixed to the shaft of a controller 49. This controller may be of any desired type; and its function is, of course, to convert the direct current into three phase current to be supplied to the synchronous motor 45. As stated above the motor will follow the controller, either forward or backward, and will also follow the speed of operation of the controller. I do not illustrate any mounting for the controller, as it may be located at any convenient place, and is preferably not attached to the recording device, except by the wiring 50 between the controller and the synchronous motor. By this arrangement the recording device is free so that it may be moved bodily, as will be described hereinafter.

From the above it is apparent that the wheels of the map-car will be propelled in accordance with the distance traveled by the vehicle; and of course, this movement will be recorded on the sheet by the recording implement 38. But it is also apparent that after a very slight movement of the map-car the wheels would become ineffective if the car 8 or car 20 were not moved the proper distance, in order to keep the shaft 40 in a substantially vertical plane. That is, the map-car is connected to the plate or disc 32, which is connected with the shaft 28 by means of the universal coupling 31; so that movement of the map-car must be about this coupling as a pivot, and of course the map-car could not move but a short distance without there being a tendency for the wheels to lift off the sheet and thereby become ineffective. But in the operation of this device the shaft 40 is maintained in a substantially vertical plane, for the instant there is any slight movement of the map car, the carriage 8 or the carriage 20 or both carriages 8 and 20 (depending upon the direction of movement of the map-car) are moved the proper distance to retain the shaft in, or restore it to, a vertical position. The construction of the carriages 8 and 20 and the apparatus by which one is moved back and forth and the other is moved transversely, much in the manner of an overhead crane, have been previously described, and I shall now describe briefly the means for effecting and controlling the movement of these carriages, in the proper direction, and to the desired extent.

Numeral 51 refers to a short rod which is attached to and depends from the carriage 20; the rod terminating at a point adjacent the disc 32. Attached to the lower end of this rod are two spring fingers 52, each of which carries a contact 53; the two contacts being normally spaced a slight distance by the resiliency of the fingers 52. These contacts are positioned just above the disc 32, and when the plate is tilted slightly in one direction it will close the contacts, and when it returns to a horizontal plane, or is tilted in the opposite direction, the contacts will be separated by the resiliency of the fingers. The opening and closing of the contacts 53 controls, by reason of the pole changer 54, the direction of rotation of the motor 17, by which the carriage 8 is moved backward or forward. It is needless to illustrate or describe in detail the pole changer, the electrical wiring, etc., as all such is common and well understood. I shall, however, briefly describe the manner in which the movement of the map-car controls the movement of the carriage 8. Let it be assumed that the map-car is in the position shown in Figure 1, with the disc 32 in a horizontal plane, and that by reason of the distance traveled by the vehicle the wheels 35 are rotated to move the map-car slightly forward. This will cause the shaft 40 and rods 39 to be slightly inclined, and the disc 32 will be accordingly tilted. This tilting of the disc will cause the contacts 53 to be brought together, thereby causing the motor 17 to rotate its shaft in the direction to move the carriage 8 slightly forward. This slight forward movement of the carriage will carry forward the upper end of the shaft 40 a sufficient distance to restore it to a vertical position, and of course, the disc 32 will, at the same time, be restored to a horizontal position. As a matter of fact, the movement of the carriage 8 will usually carry the shaft and disc slightly beyond the vertical and horizontal planes, respectively. As the disc reaches the horizontal plane, or passes slightly therebeyond, the spring fingers 52 will cause the contacts to separate, whereupon the motor 17 will rotate its shaft slightly in the opposite direction. Thus a continuous vibration of the various parts is maintained. Of course, if the map-car continues its forward travel, the carriage will be carried forward to the same extent; the shaft 40 being continually maintained in a vertical or substantially vertical position. The distance traveled by the vehicle is thus recorded on the sheet 4 by the recording implement 38.

Numeral 55 refers to two contacts which are also arranged just above the disc 32, but spaced 90° from the contacts 53, as shown by Figure 2. These contacts are carried by spring fingers 56 attached to the rod 57 which is carried by and depends from the carriage 20. The opening and closing of the contacts 55 controls, by reason of the pole changer 58, the direction of movement of the motor 21, by which the carriage 20 moved to the right or left (Fig. 1). The manner in which the contacts 55 are operated, and the manner in which their opening and closing controls the movement of the carriage 20 to the right or left, is exactly the same as above described in connection with the contacts 53 and the movement of the carriage 8 forward or backward. Assumes that the map-car has been rotated through 90° from the position illustrated in Figure 1, and that the wheels 35 are rotated to carry the map-car slightly to the right. This movement will slightly tilt upwardly the right side of the disc 32 thereby forcing the contacts 55 together. This will cause the motor 21 to rotate its shaft in the direction to move the carriage 20 slightly to the right, thereby restoring the disc 32 to a horizontal plane, or tilting it slightly beyond the horizontal plane. The contacts 55 will thereupon be separated by the action of the spring fingers 56, and the motor 21 will rotate its shaft slightly in the opposite direction, thereby maintaining the parts in a state of continuous vibration. Of course, if the map-car continues its travel to the right, the carriage 20 will move to the right to the same extent; the shaft 40 being maintained in a vertical, or substantially vertical position.

In the foregoing description, I have described only two directions of movement of the map-car; but it will be understood that the map-car will be moved in any direction, depending upon the course of the vessel or vehicle, and it is apparent that at times contacts 53 and 55 will both be closed, at other times both will be open, and at other times one will be open and the other closed; so that at times both carriages will be simultaneously moving in either direction, or one may be moving and the other stationary, etc. The movement of the carriages depends on the course, and the extent of movement of the carriages depends on the distance traveled by the vessel or vehicle; but it will be understood that whatever may be the direction of movement of the map-car (which direction as will appear hereinafter is controlled by the course of the vessel or vehicle) the carriages will be so moved as to maintain the shaft 40 in a vertical or substantially vertical position. All that remains to be described is the means for controlling the direction of movement of the map-car, and I shall now proceed with such description.

Numeral 59 refers to the compass box or housing of an electro-magnetic compass. As stated hereinbefore a gyroscope compass or a repeater may be employed in place of the electro-magnetic compass, but I preferably employ the latter. The electro-magnetic needle is indicated by numeral 60 and it may be supported in the compass box in any desired manner. I have, however, devised a novel form of mounting, which I preferably employ. In this preferred form, the needle is suspended by metallic ribbons 61 and 62, which permit the necessary slight relative rotary movement between the needle and the compass box. In order to prevent the needle from tilting too much, I have mounted thereon tubular members 63, which surround the ribbons 61 and 62 but are spaced slightly therefrom; so that after a certain degree of tilting movement the tubular members will strike the ribbon attaching pins and prevent any further tilting of the needle.

The compass box is attached to a disc 64, the periphery of which is toothed, as indicated by numeral 65. The teeth 65 mesh with a pinion 66 keyed to a shaft 67 rotatably mounted on a plate 68 which is secured to and spaced above the carriage 20 by the rods 69. Keyed to the lower portion of the shaft 67 is a worm wheel 70 meshing with a worm 71 on a shaft 72 of a motor 73; the motor shaft 72 being journaled in bearings 74, 74. The opposite end of the motor shaft 72 carries a worm 76 meshing with a worm wheel 75, which is keyed to a vertical shaft 77. The lower portion of the shaft 77 is provided with a pinion 78 meshing with the large gear 29. As previously described, the gear 29 is fixed to the shaft 28, which shaft has a universal coupling with the shaft 30 which is keyed to the disc 32. This disc is rigidly connected with the map-car by means of the rods 39. Thus the rotation of the shaft 27 causes the map-car to be turned in the desired direction and to the desired extent. The shaft 27 may therefore be properly termed the steering shaft of the map-car. It is also apparent that when the motor 73 imparts a slight rotary movement to the compass box, the same rotary movement is imparted to the steering shaft 27 and thence to the map-car, by reason of the gearing and shafting hereinbefore described. The motor 73 is controlled by the electro-magnetic needle 60, as will now be briefly described.

The needle 60 carries a contact 79 adapted to engage a contact 80 carried by the compass box 59. There is no invention in the wiring per se, and it is sufficient to state that the circuit includes a pole changer 81, to reverse the motor 73. Also, I might mention that the several contacts are maintained, during the rotation of the compass box, by means of a button 82 and rings 83 and 84 mounted on the lower face of a plate 85 which is fixed to and rotates with the disc 64. The plate 85 is mounted for rotation on a plate 86, by means of a ball-bearing race 87, and this plate carries spring finger contacts 88, 89 and 90, engaging respectively the button 82 and the rings 83 and 84.

The operation of the apparatus for steering the map-car in accordance with the course of the vessel or vehicle, will now be described. Let it be assumed that the vessel or vehicle changes its course from north to east. The complete apparatus will thereby be turned through 90°, and the contact 80 will engage the contact 79 of the compass needle and thus rotate the needle with the compass box. But the instant the contacts meet, the motor 73 is reversed to return the compass box back to its former position. This movement will continue as long as the two contacts are engaged, so that the box will be turned back through 90° in the present instance. But while the motor, through shaft 72, worm 71, worm wheel 70, shaft 67, pinion 66 and gear 64, was rotating the compass box back through 90°, it was simultaneously turning the map-car through 90°, by means of the shaft 72, worm 76, worm wheel 75, shaft 77, pinion 78 and gear 29 to the steering shaft 27 and thence to the map-car, as hereinbefore described. Thus, while the entire apparatus, including the recording sheet and map-car, has been turned bodily through 90° by reason of the vessel or vehicle changing its course, it will be noted that the map-car has been turned through an additional 90° to the right, while the compass box was being turned back to its north position, so that the map-car now faces the end of the chart marked East. It is not to be understood that the map-car actually faces the east. On the contrary it actually faces the south, but the north end of the recording sheet has been carried around to the east by the change in the course of the vessel, and thus in order that the map-car may record an east course on the sheet it must actually face 90° to the right of the end of the chart marked North, so that the map-car would actually be facing south in order to record an east course.

It will be understood, of course, that if the vessel should change its course, as in the above example from north to east, the compass box is not actually turned through 90° with the vessel or vehicle, and then turned back 90° to its north position; for the two movements are substantially simultaneous, that is, as soon as the vessel or vehicle has changed its course slightly, the compass box will be turned back slightly, and this will be kept up during the continued change in course. So that the compass box is, in reality, maintained in a substantially north position. It will also be understood that when the contacts 79 and 80 meet the motor 73 is rotated in one direction, and that when the contacts are separated the motor is rotated in the opposite direction, so that the compass, the map-car and the intervening operating mechanism, are maintained in a state of constant vibration.

I have described the complete apparatus, and the function and operation of the various parts have been described in the course of the description of the apparatus; and accordingly, any further detailed description of the operation is unnecessary. It is sufficient to state that by the apparatus disclosed, operated in the manner described, the courses and distances traveled will be indicated on the recording sheet in practically the same manner that route lines are indicated on a map.

The recording sheet may be of any desired shape, but I preferably employ sheets of hexagonal cut, as they possess several advantages over other shapes.

When the map-car comes to the edge of the recording sheet, by reason of continued travel in the same direction, or otherwise, additional sheets will be added. At the same time the whole machine may be shifted bodily by hand, by sliding the legs of the machine frame across the recording table. It will be understood that when the frame is shifted bodily the map-car will remain at its same position on the recording sheet, but the carriages will move from their old positions on the rails to their new positions on the rails, so as to keep the shaft 40 of the map-car perpendicular, as hereinbefore described.

Although I have described one motor for each of the moving arrangements, yet it is obvious that a greater or lesser number of motors could be employed. Also the motors have been described as of the reversible type, but single way motors may be employed, and the counter movements be had by means of reversible transmissions.

Also the carriages have been described as traveling on rails, much in the manner of overhead cranes, but in place of this construction I may employ rocking arms or other devices for maintaining the shaft 40 substantially perpendicular.

In the apparatus, as described, the map table is fixed; but it is obvious that I may have the heading of the map-car fixed with its vessel or vehicle, and rotate the map table. In such an arrangement the map-car will be travelling in the same direction as the vessel or vehicle, geographically as well as on the recording sheet.

The invention disclosed herein is obviously subject to wide modifications and changes, without departing from the spirit of the invention; and all such modifications and changes I aim to include in the scope of the appended claims.

In the foregoing description, and in the appended claims, wherever the word vehicle appears, it will be understood to mean a vessel, an automobile, a tractor, an aeroplane, an airship, or any other conveyance or device upon which the recording instrument may be mounted.

What I claim is:

1. An instrument for recording the courses and distance traveled by a vehicle, including a map-car, means for moving the map-car in accordance with the distance traveled by the vehicle, and means for changing the heading of the map-car in accordance with changes in the course of the vehicle.

2. An instrument for recording the courses and distance traveled by a vehicle, including a fixed recording sheet, a map-car carrying a recording pen, means for moving the map-car in accordance with the distance traveled by the vehicle, and means for changing the heading of the map-car in accordance with changes in the course of the vehicle.

3. An instrument for recording the courses and distance traveled by a vehicle including a wheeled map-car, means for propelling the wheels thereof in accordance with the distance traveled by the vehicle, and means for steering the map-car, the course of the map-car being changed in accordance with changes in the course of the vehicle.

4. An instrument for recording the courses and distance traveled by a vehicle, including a map-car, a shaft for driving the map-car, and means for maintaining said shaft in a substantially vertical position.

5. An instrument for recording the courses and distance traveled by a vehicle, including a wheeled map-car, a driving shaft for propelling the wheels of said map-car, and means for maintaining said shaft substantially vertical as the map-car moves.

6. An instrument for recording the courses and distance traveled by a vehicle, including a wheeled map-car, a driving shaft for propelling the wheels of the map-car, means for maintaining said shaft substantially vertical as the map-car moves, and means for changing the course of the map-car in accordance with changes in the course of the vehicle.

7. An instrument for recording the courses and distance traveled by a vehicle, including a wheeled map-car, a differential associated with the driving axle of said map-car, a substantially vertical shaft for propelling the map-car, and means for maintaining said shaft in a substantially vertical position during movement of the map-car in any direction.

8. An instrument for recording the courses and distance traveled by a vehicle, including a wheeled map-car, a differential associated with the driving axle of the map-car, a substantially vertical shaft for propelling the map-car, means for operating said shaft in accordance with the distance traveled by the vehicle, and means for maintaining said shaft in a substantially vertical position during movement of the map-car in any direction.

9. A recording instrument including two carriages, one mounted on the other and adapted to travel back and forth in paths arranged at right angles, a map-car, means for propelling the map-car, and means for moving the carriages to maintain the driving shaft of the map-car in a substantially vertical position.

10. A recording instrument including two carriages, one mounted on the other and adapted to travel back and forth in paths arranged at right angles, a map-car, a steering shaft mounted on one of the carriages, and an operative connection between the steering shaft and the map-car.

11. A recording instrument including a wheeled map-car, two carriages movable at right angles to each other, one of said carriages mounted on the other, means for moving said carriages to maintain the driving shaft of the map-car in a substantially vertical position, and means associated with one of the carriages for steering the map-car.

12. An instrument for recording the courses and distance traveled by a vehicle, including a fixed recording sheet, a wheeled map-car, means for propelling the map-car in accordance with the distance traveled by the vehicle, a direction indicator, and means controlled by the direction indicator for changing the course of the map-car in accordance with changes in the course of the vehicle.

13. A recording device, including a wheeled map-car, means for propelling the vehicle, a member rigidly fixed to the map-car and adapted to be tilted by movement of the map-car, and electrical contacts adjacent said member adapted to be operated by the tilting movement thereof.

14. A recording device, including a wheeled map-car adapted to travel over a fixed recording sheet, means for propelling the map-car, a member normally in a substantially horizontal plane rigidly secured to the map-car and adapted to be slightly tilted by movement of the map-car, electrical contacts adjacent said member and adapted to be operated by the tilting movement thereof, and means controlled by said contacts for restoring the member to a horizontal plane.

15. A recording device, including a wheeled map-car adapted to travel over a fixed recording sheet, a substantially vertical shaft for propelling the map-car, electrical contacts adapted to be operated when said shaft is moved out of the vertical plane, and means controlled by said contacts for restoring the shaft to a vertical plane.

16. A recording device, including a wheeled map-car, a substantially vertical shaft for propelling the wheels of the map-car, a disc associated with said shaft, electrical contacts adjacent said disc, the operation of said contacts being controlled by the disc, and means controlled by said contact for maintaining said shaft in a substantially vertical position during movement of the map-car in any direction.

17. A recording device, including a wheeled map-car, a substantially vertical shaft for propelling the map-car, electrical contacts adapted to be operated when said shaft is moved out of the vertical plane, means controlled by said contacts for restoring the shaft to a vertical plane, and means associated with said shaft for steering the map-car.

18. A recording device, including a wheeled map-car, a substantially vertical shaft for propelling the map-car, a second shaft connected with the first-mentioned shaft by a universal coupling, and means to rotate the second-mentioned shaft to change the heading of the map-car.

19. A recording device, including a wheeled map-car, a substantially vertical shaft for propelling the map-car, means for maintaining the shaft in a substantially vertical position during movement of the map-car in any direction, a second shaft pivotally connected with the first-mentioned shaft, and means for rotating the second-mentioned shaft for changing the heading of the map-car.

20. An instrument for recording the courses and distance traveled by a vehicle, including a wheeled map-car, a substantially vertical shaft for propelling the map-car in accordance with the distance traveled by the vehicle, means for maintaining the shaft in a substantially vertical position during movement of the map-car in any direction, a second shaft having a universal coupling with the first-mentioned shaft, a compass, and means controlled by the compass to turn the second-mentioned shaft to thereby steer the map-car.

21. An instrument for recording the courses and distance traveled by a vehicle, including a wheeled map-car adapted to travel over a fixed recording sheet, a substantially vertical shaft for propelling the map-car in accordance with the distance traveled by the vehicle, a vertical shaft rotatably mounted on a carriage and having a universal coupling with the first-mentioned shaft, said carriage movable back and forth, the second carriage on which the first-mentioned carriage is mounted and said second carriage adapted to move back and forth in a path at right angles to the path of movement of the first-mentioned carriage, means controlled by the first-mentioned shaft for so moving said carriages as to maintain the first-mentioned shaft in a substantially vertical position during movement of the map-car in any direction, a compass carried by the first-mentioned carriage, and means controlled by said compass to rotate the second-mentioned shaft to change the course of the map-car in accordance with a change in the course of the vehicle.

MANTER H. FUNG.